United States Patent [19]
Ellis

[11] Patent Number: 5,735,660
[45] Date of Patent: Apr. 7, 1998

[54] LOAD HANDLING

[75] Inventor: Glynn Arthur Ellis, Loughborough, England

[73] Assignee: Razedge Limited, England

[21] Appl. No.: 284,690

[22] PCT Filed: Feb. 15, 1993

[86] PCT No.: PCT/GB93/00321

§ 371 Date: Oct. 11, 1994

§ 102(e) Date: Oct. 11, 1994

[87] PCT Pub. No.: WO93/15875

PCT Pub. Date: Aug. 19, 1993

[30] Foreign Application Priority Data

Feb. 14, 1992 [GB] United Kingdom .................... 9203156

[51] Int. Cl.[6] ................................................. B23Q 7/04
[52] U.S. Cl. ........................................ 414/225; 414/744.2
[58] Field of Search ................... 414/744.2, 941, 414/225

[56] References Cited

U.S. PATENT DOCUMENTS

| 4,228,701 | 10/1980 | Herpin | 76/29 |
| 4,418,589 | 12/1983 | Cowart | 76/112 |

FOREIGN PATENT DOCUMENTS

| 2586908 | 3/1987 | France . |
| 8701058 | 3/1987 | Germany . |

Primary Examiner—Karen B. Merritt
Assistant Examiner—Gregory A. Morse
Attorney, Agent, or Firm—Barnes & Thornburg

[57] ABSTRACT

An apparatus for handling a circular saw blade for performing operations on the blade at a work station includes a mechanism for carrying the blade between a supply stack of blades, the work station, and a blade off-loading location. The apparatus also includes a mechanism for supporting the supply stack of blades. The apparatus further includes a mechanism for transferring the blade between a second blade support mechanism carried by the carrying mechanism and a third blade support mechanism provided at the work station. The third blade support mechanism enables indexing of the blade through the work station.

14 Claims, 5 Drawing Sheets

LOAD HANDLING

BACKGROUND AND SUMMARY OF THE INVENTION

This invention relates to the handling of loads.

In particular, but not exclusively, the present invention is concerned with the handling of loads in situations in which a plurality of elements, in particular similar elements, are required to be successively positioned at a work station for the purposes of carrying out some operation/process on the elements and then to be transferred, after such operation/process has been carried out, to a receiving position in which elements can be subsequently handled as required. For example, the elements are stacked at the receiving position until a predetermined number has been assembled.

There are many forms of apparatus for the handling of loads.

However, with such known apparatus there are conventionally involved several load transfer stages in which the elements are transfered from support arrangements provided for moving the elements from a first position to a work/process station, from which they are transferred to further means for supporting the elements whilst they are at the work/process station, and then to transfer the elements from such further means to still further transfer arrangements serving to transport the elements away from the work/process station to, for example, a storage position.

It will be appreciated that in relation to present day industrial activities it is invariably desirable to reduce as far as possible the times involved in the working/processing or the like of workpieces. Since the total work time involvement in relation to the processing of a workpiece obviously includes transfer times to and from a work/process station, including the transfer to arrangements for supporting an element whilst at the work/process station, it is of interest to eliminate wherever possible handling operations.

Broadly, according to a first aspect of the invention there is provided a load handling apparatus characterised by means adapted to pickup/entrain an article/element from a supply thereof, to transport the article/element to a position at which it is to be subjected to some operation/process, to support the article/element whilst being subjected to a said operation/process, and also to transfer the article/element from said position to a location at which it is required to place/deposit the processed/worked upon articles/elements.

In accordance with a further aspect of the invention, in a pick and place load handling apparatus the means provided for picking up a load, and subsequently placing the load is/are the same as the means used for handling/supporting the load whilst any operational/process activities may be carried out upon the load.

Preferably, when the apparatus of the invention is utilised for handling saw blades for the purposes of presenting such blades to a blade tooth tipping operation, the apparatus of the present invention is includes means for picking up a blade (i.e., untipped) from a supply containing a plurality of blades; and means for enabling transfer of the blade to a position at which it can be indexed successively to present the teeth of the blade to the tipping station, for supporting the blade whilst it is at the tipping station, for supporting the blade during transfer of the fully tipped blade from the work station to a position at which it is required to place the blade and for off-loading the blade For a better understanding of the invention and to show how to carry the same into effect reference will now be made to the accompanying drawings in which:

DETAILED DESCRIPTION OF THE DRAWINGS

Before considering the apparatus of these Figures in some detail it is convenient to discuss a particular application of the apparatus in very general terms as applied to apparatus for applying hard material tips to saw blades. In the manufacture of circular saw blades it is the general practice to provide each tooth of the blade with a hard material tip. To do this the teeth of the blade have to be successively presented to a work/process station at which a tip is brazed or otherwise secured to each tooth as it is indexed through the work/process station.

Arrangements (not shown) are provided for indexing the teeth of the blade through the work/process i.e., tipping station and for presenting a tip to the next tooth to be tipped at the appropriate point of time.

The apparatus of the present invention is intended to be able to transfer, as required, an untipped blade from a supply containing a plurality of such blades to a position in which it can be indexed successively to present the teeth of the blade to the tipping station, to support the blade whilst it is at the tipping station, and to be able to transfer the fully tipped blade from the work station to a delivery position. For example, at the delivery position a number of tipped blades can be collected to provide a batch prior to being being removed from the collection position for what ever further activity is intended.

Figure 1:
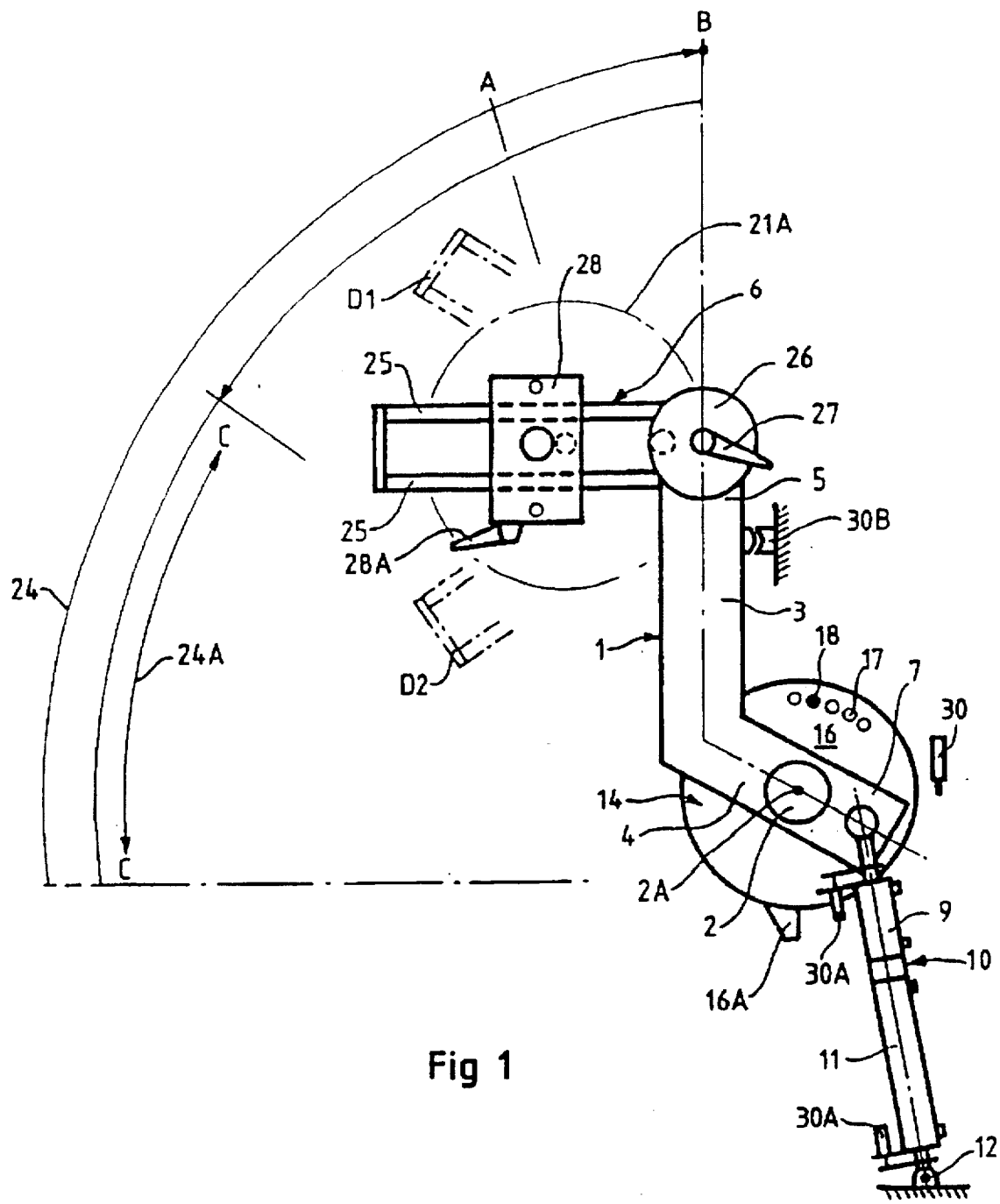
FIG. 1 schematically illustrates in elevation a first embodiment of load handling apparatus according to the invention.
Figure 2:
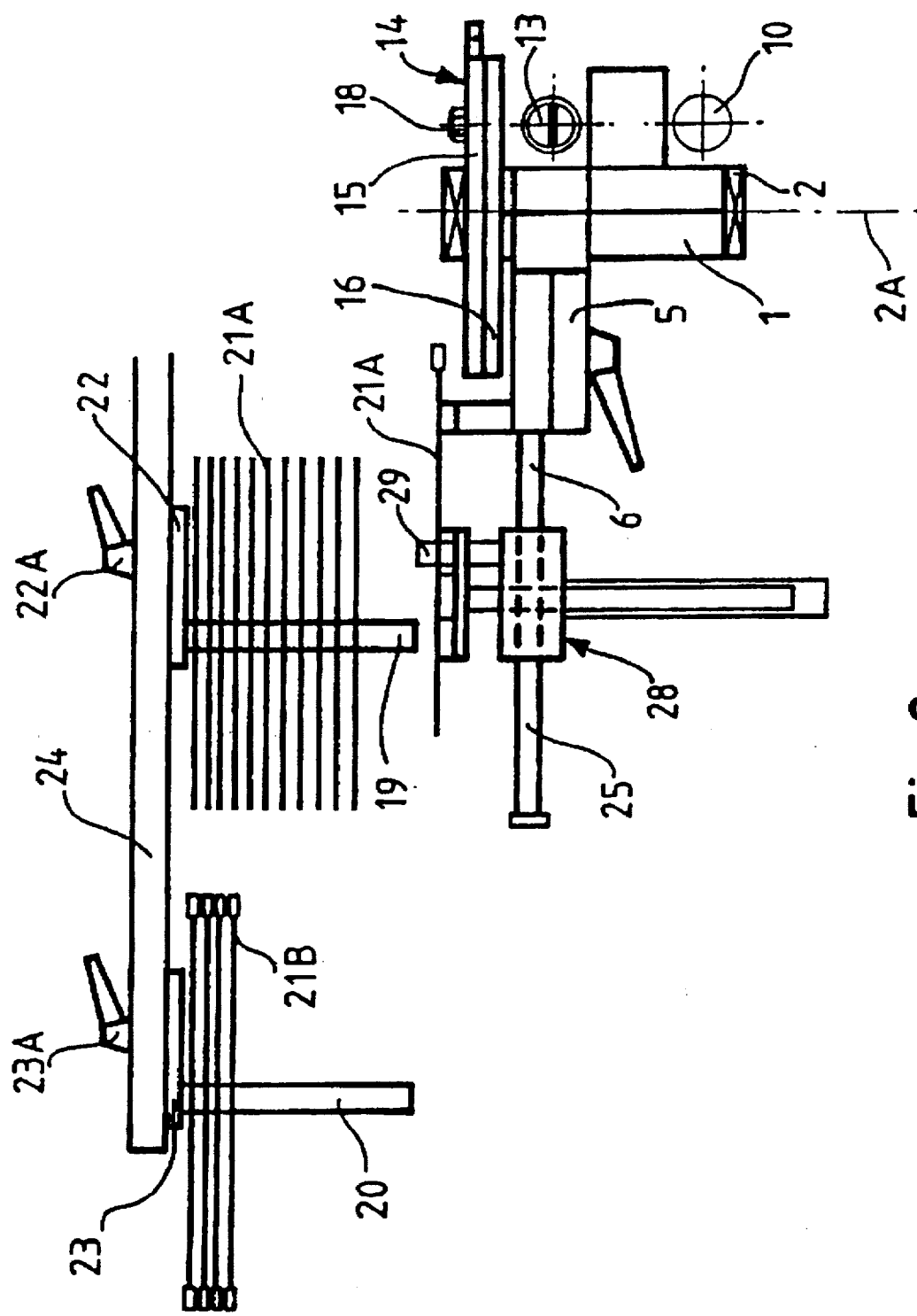
FIG. 2 is a schematic plan view of the apparatus of FIG. 1, when being utilised for the handling of circular saw blades for the purpose of transferring the blades to apparatus for applying hard material tips to the teeth thereof.

Turning now to FIGS. 1 and 2, in the embodiment shown a main load (saw blade to be tipped) handling assembly includes a load arm 1 which is mounted on a shaft 2 which is pivotable about pivot axis 2A which is operationally supported from a main framework for the tipping apparatus. The load arm 1 is cranked to provide a longer part 3 and a shorter part 4. The free end region 5 of the longer part 3 mounts a load support assembly 6.

The framework of the tipping apparatus is not shown in the FIGS. 1 and 2. The nature of the framework will be related to the design and construction of the actual tipping machine (or other articles/elements involved) and since the present application is concerned with the handling of blades/articles/elements a detailed description of a machine with which the apparatus of the invention is used is unnecessary. The apparatus of the invention can be regarded as forming an assembly which is fixedly mounted to the framework of the tipping machine at appropriate locations.

The free end region 7 of the shorter part 4 of the load handling arm is pivotally coupled to the shorter ram unit 9 of a dual ram assembly 10 including the shorter ram unit 9 and a longer ram unit 11 operationally connected in series with the shorter ram unit 9. The longer ram unit 11 is pivotably connected to a fixed position 12, the latter being associated with said framework (not shown).

The provision of the double ram unit assembly 10, facilitates the selective production of the required operational movements of the load arm 1, i.e., when the shorter ram unit 9 is operated a first load arm rotation is produced and when the longer rain unit is operated a second load arm rotation is produced and if both are operated a third load arm rotation is obtained.

The overall weight of the lever arm and its associated load support assembly 6 is counterbalanced by a spring arrangement which is schematically indicated at 13 in FIG. 2.

The operational position of the load arm 1 can be selectively set with respect to the shaft/axis 2 by a position adjustment means 14. This adjustment means 14 includes a plate 15 fixed to the shaft 2 and thus effectively to the aforesaid framework and a second plate 16 complementary to the plate 15 and which is freely moveable about the shaft 2. The plate 16 is provided with a radially directed lug 16A. The plates 15 and 16 are angularly settable relative to each other by rotating the plate 16 relative to the plate 15. Bores 17 are provided in the plates 15 and 16, the spacing of the bores in the plates are such that the position of the lug 16A relative to a horizontal plane through the axis of rotation of the shaft 2 can be positionally set by rotating the plate 16 relative to the plate 15 and engaging a stop bolt 18 in an appropriate pair of cooperating bores 17.

In the particular application of the load carrying apparatus of the invention to a machine for the tipping of the teeth of saw blades, the saw blades to be tipped are transferred to and from the position at which the tips are secured to the teeth of the blades.

The articles/elements to be handled i.e., saw blades must be positioned in convenient locations to allow the load handling arrangements to pick up a blade, and to unload a blade after it has been tipped.

In the particular application of the load handling arrangements use is made of the fact that circular saw blades have a bore for allowing the blade when required for use to be mounted to a drive shaft.

Thus in the present case a mandrel 19 is provided for carrying a supply of untipped blades and a second mandrel 20 is provided for carrying blades that have been tipped. The mandrels are axially horizontal and are arranged parallel to each other and respectively project from mandrel support units 22 and 23 which, in turn, are releasably securable by operation of locking handles 22A and 23A to a mandrel support unit mounting member 24. This member 24 is of arcuate construction and is firmly mounted at opposite ends thereof to the machine framework. The member 24 defines an arcuate guide, which lies in a vertical plane, for the units 22 and 23.

The purpose of such formation of the guide track for the mandrel support units 22 and 23 is to enable a range of saw blade diameters to be accommodated on the tipping apparatus. In other words, the positions of the mandrel support units relative to each other and to the guide 24 will be related to the diameters of the blades to be tipped and additionally to the physical dimensions of the load handling arm 1 and its associated components to be considered hereinafter.

The load arm assembly i.e., blade, support assembly 6 includes a pair of guide rods 25 arranged axially parallel to each other and mounted to a support unit 26 which is connected to the crank arm end region 5 by way of a pivotable connection. The angular set of the rods 25 can be positionally adjusted with respect to the longitudinal axis of the crank arm longer part 3 and locked in an adjusted position by a locking handle 27.

The rods 25 slidably mount a saw blade support mandrel unit 28 having a mandrel 29 whose axis is parallel to the axis of the previously mentioned mandrels 19 and 20. The unit 28 is selectively positionally settable lengthwise of the rods 25 in relation to the diameter of a blade 21 that is to be carried by the support mandrel 29, and can be locked in a required position by a locking handle 28A.

The three mandrels 19, 20 and 29 can thus be positionally relatively set according to the diameter of the saw blade.

Clearly, in the case of other forms of articles/elements to be handled the supports therefore will be related to the structure and form of such articles/elements.

The blade support mandrel 29 is positionally adjusted with respect to the guide rods 25 so that the teeth of the blade to be tipped can be correctly positioned with respect to the tip welding position of the tipping apparatus. In FIG. 1 this position is such that the required tip/tooth position lies on the vertical line from 'B' passing through the pivot axis of the assembly 6 when the arm is in the position shown in FIG. 1.

In the operation of the load handling apparatus in relation to the handling of saw blades to be tipped the operational settings of the arm will be related to the diameters of the blade.

In discussing the operation it will be presumed that the arm is initially positioned as shown in FIGS. 1 and 2, this being conveniently regarded as the rest position and that the first stage in an operational sequence is the picking-up of a blade. To do this the ram unit 9 is operated to pivot the load arm anticlockwise i.e., downwardly to the position marked 'A' on the guide path 24. The particular location of 'A' along the guide is as has been mentioned determined by the diameter of the blade to be tipped.

The precise adjustments of the mandrels 29 and 19 necessary to adjust them to a coaxial position when the load arm has been displaced by the ram unit 9 is set by suitable adjustments of the block 28 along the rods 25 and the angular set of the rods 25 relative to the arm part 3. When such correct setting has been attained, operation of ram unit 9 will always bring the mandrel 29 to the position at which it is intended to pickup/receive a blade to be tipped from the mandrel 19.

Similarly, by operating the longer ram unit 11 together with position adjustment of the mandrel support unit 23 for the mandrel 19 and the mandrel 29 can be brought into coaxial alignment. It will be appreciated that the shaping of the guide track 24 will be such that once the various adjustment settings have been made for attaining coaxial alignment of the mandrels 19 and 29 it is only necessary to set the position of the mandrel 20 to achieve coaxial alignments with the mandrel 20 following the operation of the ram unit 11. In the FIG. 1 the off-loading location of the mandrel 20 is indicated by the letter 'C'. As shown 'C' can be anywhere within a range indicated by the arrow headed line 24A.

In FIG. 1, the dashed regions 'D1' and 'D2' schematically illustrate the locations of the rods 25 etc. when the arm is at positions 'A' and 'C'.

In order to provide for the cushioning of the downward displacement of the arm 1 when in the off-loading position, use is made of the previously mentioned lug 16A by enabling the latter to cooperate with stop means 30 when the mandrel moves into alignment with the mandrel 20.

It will be clear that the setting of the lug 16A relative to a vertical plane through the shaft axis 2A will determine the extent of maximum anti-clockwise movement of the laod arm 1. Additional shock absorbing means 30A are associated with the ram units 9 and 11. Clockwise movement of the arm is limited by a stop system 30A.

The load carrier unit 28 incorporates a magnetic blade entrainment assembly 33 for the actual handling of the blades from mandrel to mandrel.

Figure 3:
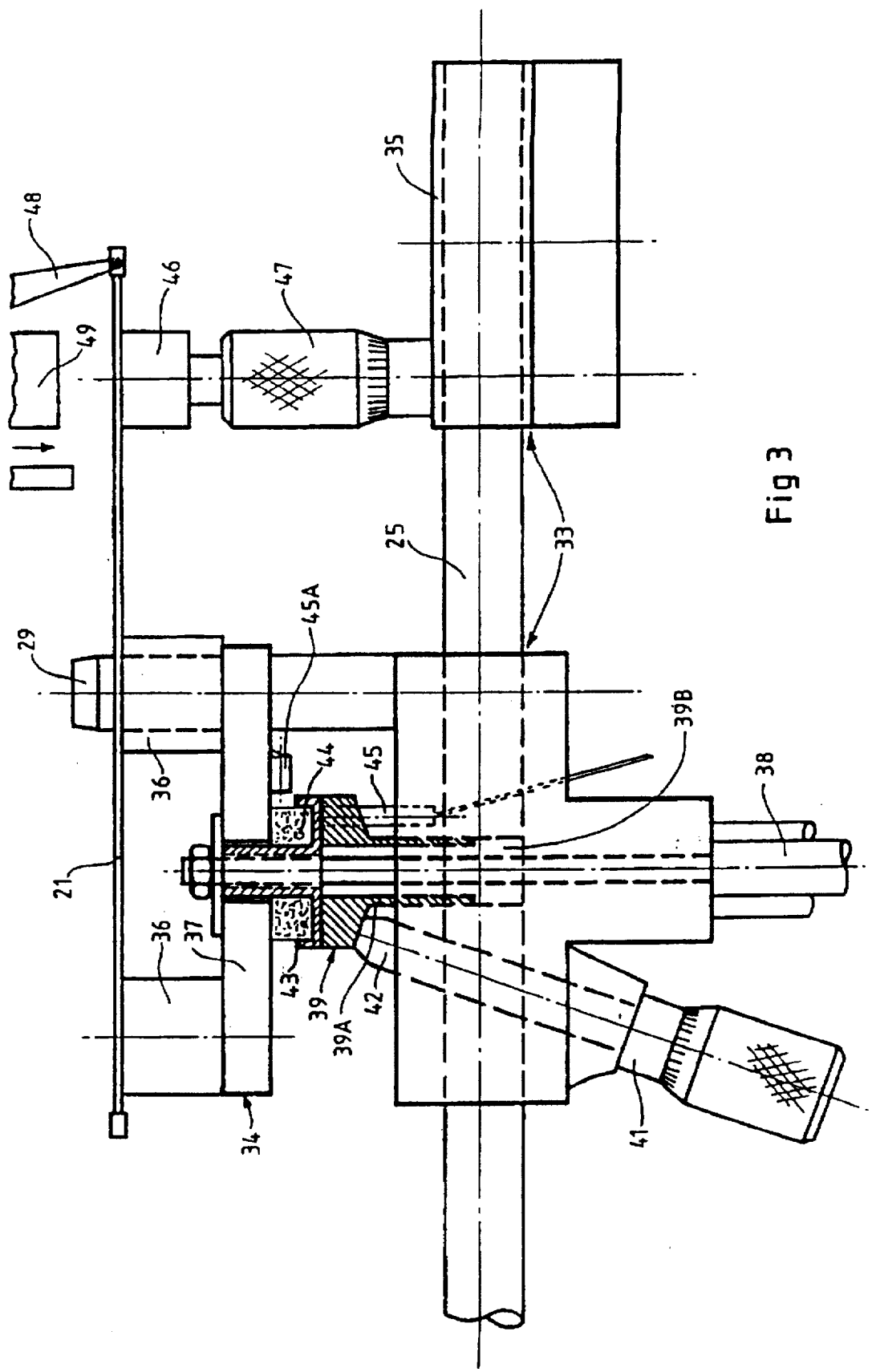
FIG. 3 schematically illustrates to an enlarged scale a detail of a load carrying unit of the apparatus of the present invention.

FIG. 3 illustrates an embodiment of a magnetic blade handling assembly 33 comprising two main sections, a first of which 34 is provided with magnets of which two are shown at 36 and which are mounted from a support plate 37 which, in turn, is carried upon the ram rod 38 of a hydraulic/pneumatic unit 38A so that the plate 37 can be moved relative to the plane of the rods 25 in a direction perpendicular to the plane containing the longitudinal axes of the rods 25. With this arrangement the mandrel 29 and the magnet assembly 33 can be advanced or retracted with respect to the mandrels 19 and 20 either to pick-up a blade to be tipped or to off-load a tipped blade to the delivery mandrel 29.

The mounting of the plate 37 involves a support member 39 having a downwardly depending skirt 39A which is axially moveable within a recess 39B provided in the ram unit 38. A micrometer type adjustment unit 41 determines the extent of downward (retraction) of the skirt 39A into the recess 39B. By means of the adjustment unit 41 which is of the micrometer type and whose operational end 42 contacts the rear of the member 39 the retraction, position of the plate 37 can be selectively set with respect to the plane of the axes of the rods 25.

The member 39 carries a cup 43 which contains a compressible elastomer 44 i.e., spring or sponge like material, which is effectively interposed between the cup and the rear face of the plate 37.

The cup 43 is associated with a sensor means 45 which serves to detect when the member cup has reached the retracted position.

A second sensor 45A is provided for detecting when the cup and thus the plate 34 have been advanced to the required operational extent.

The second part 35 of the magnetic assembly includes a further magnet 46 which is positionally adjustable by a micrometer adjustment means 47 in a direction perpendicular to the axial plane of the rods 25. The provision of this magnet 46 makes it possible very accurately to set the medial plane of a blade 21 relative to the rods 25 whereby its position relative to the tipping arrangements is accurately set throughout the actual tipping operation. It should be noted that the magnet 46 is so positioned as to cooperate with the blade 21 being tipped at a location as close as possible to the actual tipping position.

In operation, during the picking-up of a blade the mandrel 29 is by operation of the ram unit 9 brought into line with the mandrel 19. The plate 37 is then advanced towards the blade by operation of the ram 38 to a position in which energisation of the magnets will pull a blade away from the mandrel 19 and onto the mandrel 29.

The output from the sensor 45A is used so to control the advancing movement of the plate as to prevent further advance of the plate after a saw blade has been contacted by the magnets. The shock absorbing material/spring 44 accommodates any additional advance of the ram rod that may occur between between the sensing of the contact with the blade and the stopping of the ram rod movement.

When the engagement of the magnets 36 and 46 with the blade has been sensed the direction of movement of the ram rod 38 is reversed whereby the plate 37 is withdrawn towards its initial start position such as is shown in the FIG. 3. The return movement continues until the support member 39 makes contact With the adjustment unit 41 and actuates the associated sensor means to produce a signal which is used to stop further retracting movement of the ram unit 38 so that the plate 37 is brought to rest.

Once the blade has been entrained onto the mandrel 29 the ram unit 9 is operated to bring the arm to the position 'B' which corresponds to the blade tipping position of the blade tipping machine.

The tipping machine is then caused to undergo its blade tipping cycle. Through out this cycle the blade is supported by the mandrel 29. The energisation of the magnets is controlled such that the blade may be suitably indexed whilst at the tipping position and being maintained in a desired indexed position throughout the actual tipping operation.

After the tipping operation has been completed on the blade the ram unit 9 and 11 are operated to transfer the blade from the tipping position to the off-loading position 'C' i.e., to the mandrel 20.

During the course of this transfer movement the load arm swings down to until the lug 16A cooperates with the stop 30. With the various settings of the mandrels as soon as the mandrel 29 aligns with the mandrel 20 the lug contacts the stop and the magnetic assembly is operated in such manner as to advance the plate 37 to push the tipped blade from the mandrel 29 onto the mandrel 20.

Once the blade has been so removed from the mandrel 29 the ram unit 11 is operated to bring the mandrel 29 into line with the mandrel 19 which is at the blade loading position. A fresh untipped blade is then loaded onto the mandrel 29 as previously discussed. Once the fresh blade has been loaded, the ram unit 9 is operated to transfer the blade to the tipping position.

It should be noted that during the off-loading displacement of the load arm, the weight of the blade is assisting the movements and that the arm is not carrying a load during the transfer movement from the off loading to the loading position, and that following the transfer of a fresh blade to be tipped onto the mandrel 29 the now loaded arm has only to travel for a relatively short angular distance.

The various shock absorbing arrangements serve to cushion the various movements of the load arm.

It will be understood that during the tipping of the blade the latter has to be indexed to present a fresh tooth for the tipping operation. It will be appreciated that the energisation of the magnets will be suitably controlled to facilitate the blade indexing.

An indexing finger for the blade is very schematically shown at 48. During tipping operation it is important to clamp the blade in the area against movement. Part of the clamping arrangement is schematically shown at 49.

In applications in which it is desired to provide vertically oriented mandrels for the stack of untipped blades and for the stack of tipped blades the structure of the load carrying arrangements will be modified so as to enable the pick-up and off-loading from the vertically oriented mandrels.

Figure 4:
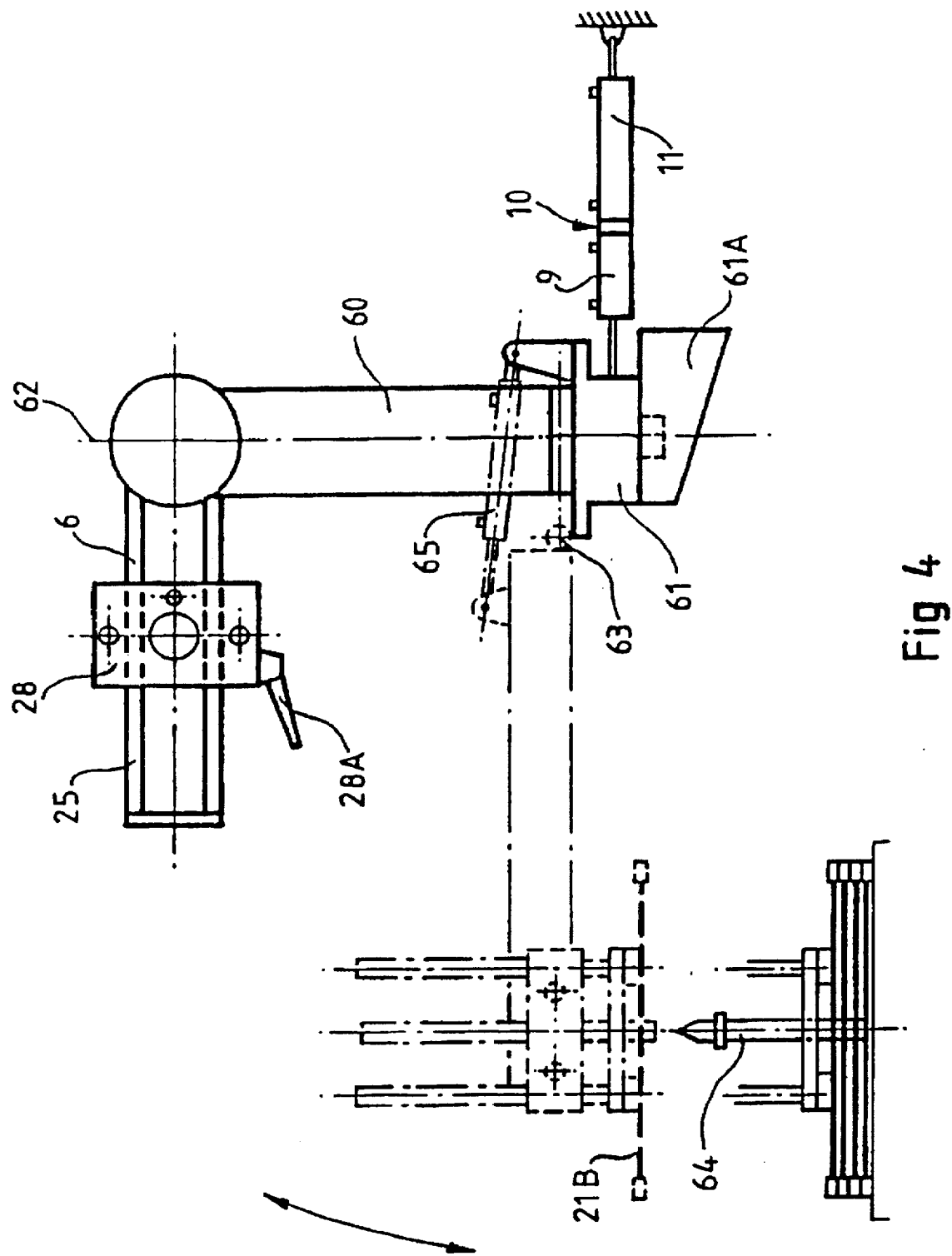
FIG. 4 schematically illustrates a modified form of the load support assembly of the apparatus of FIGS. 1 and 2, the FIG. 4 indicating in full lines a first operational setting and in chain dashed lines a further operational setting.
Figure 5:
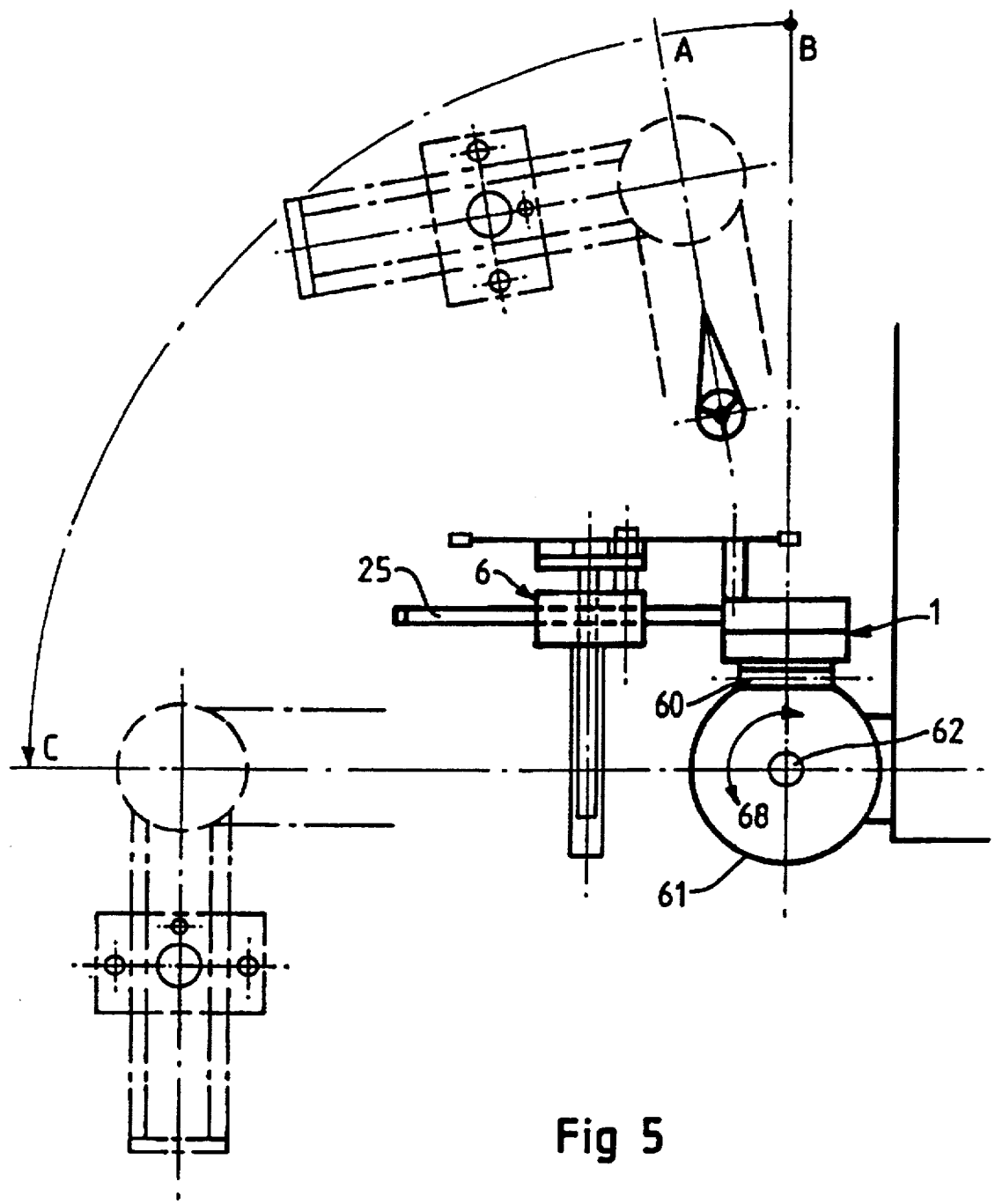
FIG. 5 schematically illustrates in plan elevation the arrangement of FIG. 4, the FIG. 5 indicating in full lines a first operational setting and in chain dashed lines a further operational setting.

FIGS. 4 and 5 schematically illustrate a modification of the above discussed apparatus in which the mandrels for the tipped and untipped blades are arranged vertically rather than horizontally as has been considered in relation to the previous Figures. In relation to FIGS. 4 and 5 those components which have been disclosed in previous Figures will be identified by the same reference numerals.

In this modification the load arm 60 is mounted at its lower end upon a support plate 61 in such manner that it is rotatable about a vertical axis 62.

The upper end of the arm carries a blade support assembly 6 and associated components similar to those provided on the previously discussed embodiment.

The rotation of the rotatable support for the arm is effected by means of a ram arrangement similar to that of the ram unit 10.

The arm is pivotable between the upright position shown in full lines in the FIG. 4 into a horizontal position as is shown in chain dashed lines in the same Figure.

Thus in the arrangement of FIG. 5 which is as stated a plan view of the modified apparatus, the method of supporting the load arm 1 allows the load arm plus assembly 6 to be moved from the position shown in full lines (corresponding to the arrangements as shown in FIGS. 1 and 2) to the position shown in the chain dashed lines. That is at right angles to the full line position. If desired, the arm can turn through a greater or smaller angle i.e. up to for example 270 degrees of arc.

In addition to the possible rotation about the vertical axis the support for the load arm 1 and load support assembly 6 allows the arm 1 and assembly 6 to rotate about a horizontal axis indicated by the pivot 63 in such manner that a blade carried by the load support assembly 6 can be delivered onto a vertically arranged mandrel 64. This is schematically shown in FIG. 4. A further mandrel (not shown) can be provided for receiving a supply of untipped blades (not shown).

It will be understood that the untipped and tipped blades mandrels will be suitably spaced around a horizontally arranged guide track member similar to the guide track member 24.

The raising and lowering of the load arm 1 between the horizontal and vertical positions will be conveniently under the control of a ram unit 65.

If desired the single mandrels 19 and 20 can be replaced by turret arrangements of mandrels (net shown) whereby a plurality of mandrels can be successively rotated into a working position in which the mandrel at such position can be aligned with the mandrel 29 of the load carrying assembly. This modification is particlualy suitable for bulk handling.

Whilst the apparatus of the invention has been particularly discussed in relation to the handling of saw blades for tooth tipping purposes it will be appreciated that the use of the loading apparatus of the invention is not limited to such use.

In practice the apparatus of the invention has application to a wide range of applications requiring controlled movement articles; elements etc., from position to position without it being necessary to transfer the article from one moveable transfer arrangement to another.

Thus the load handling arrangements of the invnetion can be applied to the handling of articles to be processed or worked upon by grinding machines; brazing machines; welding machines; filing machines; saw blade teeth setting machines; swaging machines; side dressing machines; press tools; drilling machines; printing machines; milling machines; drilling machines; tensioning roll machines; glazing machines; remoulding rolls using machines; shot blasting machines; polishing machines etc.

Also the principles of the load handling arrangements of the invention can be utilised in situations in which a pick and place situation arises.

I claim:

1. An apparatus for handling a circular saw blade for the purposes of performing a work operation on the blade at a work station comprising:

means for carrying the blade between a supply stack of blades upon which the work operation is to be performed and the work station at which the work operation is performed on the blade, and for carrying the thus worked-upon blade to a blade off-loading position at which the blade can be off-loaded from the carrying means;

means for supporting the supply stack of blades upon which the work operation is to be performed;

means for transferring the blade from the supply stack onto a second blade support means carried by the carrying means, said means for transferring the blade, when at said work station, also enabling transfer of the blade from the second support means to a third support means provided at the work station, said third support means enabling indexing of the blade through the work station, and said transferring means also enabling transfer of the blade from the third blade support means back to the second support means on the carrying means for subsequent movement to the blade off-loading position.

2. The apparatus of claim 1, wherein the carrying means comprises a load arm having angularly related first and second parts and the first part is pivotably mounted to a support means, and the second part mounts a bracket assembly on which the carrying means is mounted for positional adjustment lengthwise relative to the bracket assembly and thus an axis of pivoting of the load arm.

3. The apparatus of claim 2, wherein the bracket assembly is selectively angularly settable relative to the load arm.

4. The apparatus of claim 3, further comprising means for positionally adjusting the load arm with respect to its support means.

5. The apparatus of claim 4, wherein the means for positionally adjusting includes a first plate fixed to a shaft and a second plate complementary to the first plate, the second plate being freely movable about the shaft and having a radially outwardly extending lug, and the plates are angularly settable relative to each other by relative rotation of the plates, and a plurality of bores are provided in the plates with the spacing of the bores such that the position of the lug relative to a horizontal plane through the axis of rotation of the shaft can be positionally set by relative rotation of the plates and engaging a stop member in an appropriate pair of cooperating bores in the plates.

6. The apparatus of claim 2, wherein the load arm is bent to provide a longer part and a shorter part, and the bracket assembly is mounted to a free end region of the longer part and a free end region of the shorter part is connected to means for controlling the operational movements of the load arm.

7. The apparatus of claim 6, wherein the means for controlling the operational movements of the load arm includes a dual ram assembly including a shorter ram unit and a longer ram unit, and the free end region of the shorter load arm part being coupled to the shorter ram unit and the longer ram unit being pivotably connected to a fixed position, such that when the shorter ram unit is operated a first extent of load arm rotation is produced, when the longer ram unit is operated a second extent of load arm rotation is produced, and when both ram units are operated a third extent of load arm rotation is produced.

8. The apparatus of claim 1, wherein the transferring means is a magnetic blade entrainment assembly.

9. The apparatus of claim 8, wherein the magnetic blade entrainment assembly includes two main sections, in which the first section is provided with magnets mounted from a support plate carried by a ram rod of a ram unit, said ram unit being operable in such direction as to be able to displace the plate towards or away from a blade mounted on a blade support means.

10. The apparatus of claim 9, wherein the position of the plate relative to the ram unit is positionally adjustable.

11. The apparatus of claim 9, wherein the second section of the magnetic blade entrainment assembly includes a further magnet which is positionally adjustable by a micrometer adjustment means in a direction perpendicular to the plane of the support plate.

12. The apparatus of claim 1, wherein each support means includes a mandrel adapted to engage a mounting bore of the blade.

13. The apparatus of claim 1, wherein the carrying means comprises a pivotably mounted carrying arm carrying at a free end region means for supporting the second support means for blades transferred from the supply stack support means, the apparatus further comprising means for enabling displacement of the carrying arm to bring the support means mounted thereon into operational alignment with the supply stack support means, the third support means and a blade off-loading support means.

14. The apparatus of claim 1, wherein the supply stack support means and a blade off-loading support means are mounted upon the third support means in such manner that the supply and off-loading support means are positionally adjustable with respect to the location of the second support means so as to accommodate differing diameters of saw blades.

* * * * *